Dec. 30, 1930.   C. B. PARSONS   1,786,774
LOADING BLOCK
Filed Oct. 11, 1928
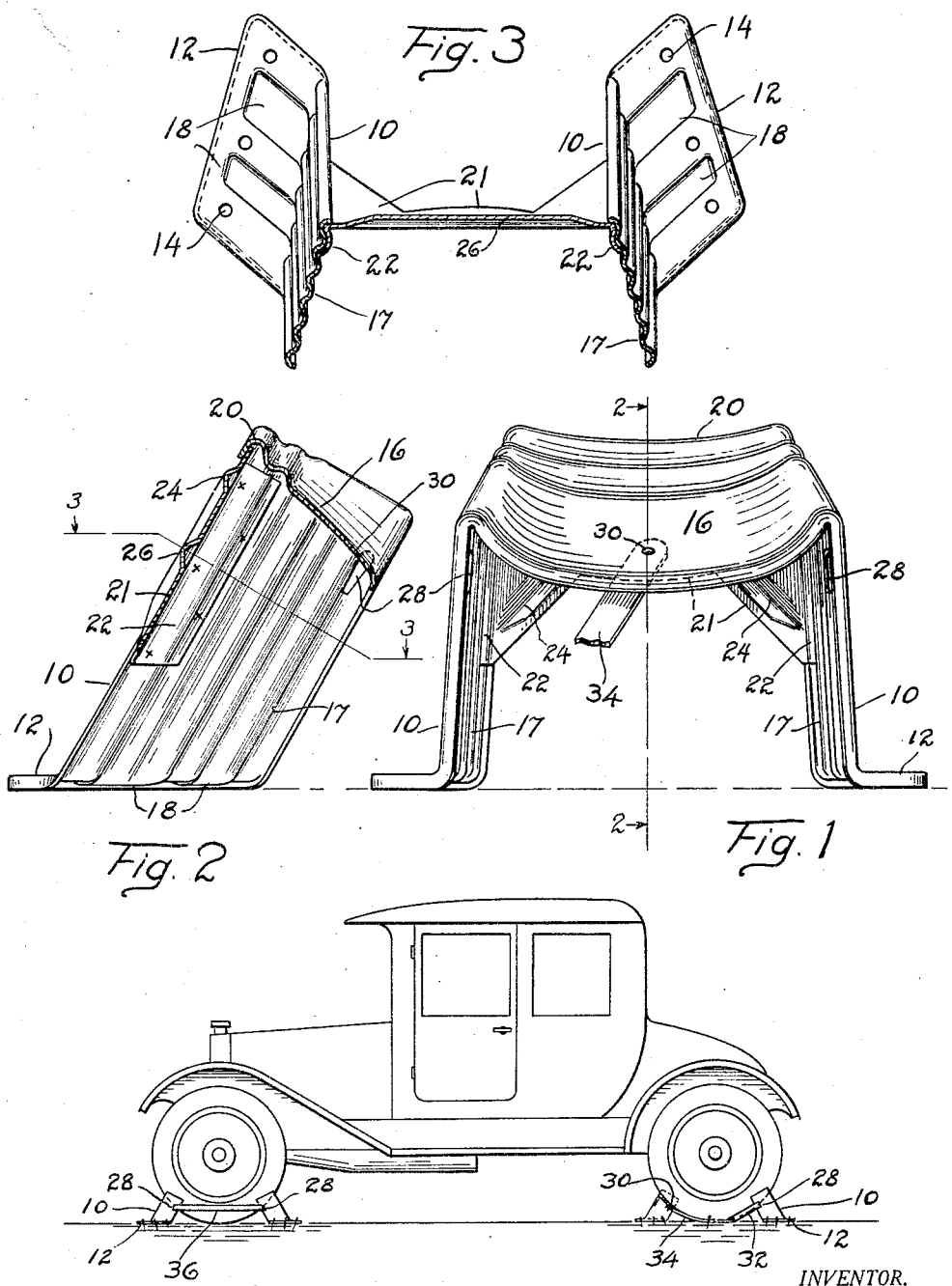
INVENTOR.
Carl B. Parsons
BY Parker & Burton
ATTORNEYS Patented Dec. 30, 1930

1,786,774

UNITED STATES PATENT OFFICE

CARL B. PARSONS, OF DETROIT, MICHIGAN, ASSIGNOR TO THE PARSONS COMPANY, OF DETROIT, MICHIGAN, A CORPORATION OF MICHIGAN

LOADING BLOCK

Application filed October 11, 1928. Serial No. 311,770.

My invention relates to an improved loading block adapted to be used to secure an automobile in place on a supporting floor during shipment.

An object is to provide a loading block which is inexpensive as to cost, sturdy in construction and adapted to be readily secured in place or removed from the car floor.

A further object is the provision of such a block formed from sheet metal whereby the block may be stamped out at a relatively slight manufacturing cost.

An important object of my invention is to provide a block of the character described, having a tire engaging portion which is so shaped as to receive the tire and so formed as to permit the tire to be distorted upon a shock applied to the vehicle during transportation such as would be caused in the quick starting or stopping of the train and particularly in so forming the tire engaging face that the curvature thereof corresponds to the curvature of the tire when under a load distortion such as would be imposed by a sudden shock or jar rather than to the normal curvature of the tire under ordinary load.

Other meritorious features consist in reinforcing the leg portions of the block and the tire engaging portion in the manner hereinafter described; in arranging the leg supporting portions as will appear from the specification; and in bracing the construction in the manner set forth.

Other objects, meritorious features and advantages will appear from the following description of the illustrative embodiment shown in the accompanying drawing and from the definitions of the several claims.

In the drawings:

Fig. 1 is a front elevation of my improved loading block.

Fig. 2 is a cross sectional view taken on line 2—2 of Fig. 1.

Fig. 3 is a cross sectional view taken on line 3—3 of Fig. 2.

Fig. 4 is a side elevation of a motor car secured in position upon a floor through the use of my loading block.

My improved loading block is formed from a sheet metal blank of suitable size and gage which is bent into the shape illustrated in Fig. 1 providing a pair of supporting leg portions 10 each having a foot 12 which rests upon and is secured to the floor of the car through the use of nails or other securing means extending through provided apertures 14.

The legs support a curved or arcuate bridge portion 16 which is adapted to engage the periphery of a pneumatic tire of the vehicle. The leg portions throughout their width are corrugated or fluted longitudinally as shown in the drawing as at 17 in Fig. 3, which fluting preferably continues into the feet as at 18, and extends across the curved tire engaging portion at its rear only as at 20. The front of the curved engaged portion is left smooth as will appear in Figs. 1 and 2 and is turned downwardly at its front margin as indicated.

The leg portions are arranged at an angle to the horizontal as appears in Fig. 2 and substantially perpendicular to the outer edges of the curved portion, whereby the load is transmitted directly longitudinally thereof. These leg portions are also arranged relatively angularly so as to converge from front to rear as shown in Figs. 1 and 3 whereby the curved or tire supporting portion is of less breadth at the rear than at the front of the block.

The legs are spaced apart by a transverse brace member 21 which has its opposite ends secured to the leg members and is preferably provided with marginal portions 22 corrugated to interfit with the corrugations in the leg members and secured thereto by spot welding or in any other suitable manner. This brace member is reinforced by corrugations or beads 24 which extend angularly with respect to each other. In the construction shown a corrugation extends upwardly from each lower outer corner of the brace member and these corrugations meet at the upper margin of the brace member intermediate the two leg portions, and a transverse corrugation 26 bridges these two diagonal corrugations.

As an additional means of fastening the loading block to the floor of the car I provide fastening members or bracing strips hereafter described. Each leg portion is provided with a slot 28 in proximity to the upper end of its front edge and the curved portion 20 is provided with an aperture 30 near its front edge intermediate the two leg portions.

A securing strip 32 may be extended through slot 28 and have its outer end fastened to the floor of the car as shown in Fig. 4 at the rear of the rear wheel or a strip 34 may be secured at one end in the aperture 30 and at the opposite end to the floor of the car by a suitable fastening device at one side of the tire as shown at the front of the same wheel. The loading blocks shown as supporting the front wheel of the vehicle are illustrated as tied together by strip 36 which extends between the two blocks and passes through the slots 28. This is an alternative form of fastening and either strip 32 or 34 or 36 may be employed.

Whichever form of fastening is employed with my improved loading block it serves effectively to support the vehicle for shipment. The legs are arranged so as to take the load in a longitudinal direction and are suitably reinforced and braced. The curved tire engaging portion is likewise reinforced while having a smooth forward portion engaging the tire, and upon which the tire may rise, upon a sudden shock, without creeping upwardly thereon or being abraded thereby.

The curvature of the tire engaging portion is such as to correspond to the curvature of the tire engaged thereby when the same is under distortion of a substantial load such as might be imposed by a sudden shock, rather than the curvature imposed by a normal load on the tire, which eliminates the danger of abrasion, rupture or structural strain due to sudden and substantial distortion. It will appear from Fig. 1 that the curvature of the tire engaging face portion at the rear is upon a longer radius than that at the front or that the front is curved to a greater depth than the rear.

What I claim is:

1. A loading block formed of a single piece of sheet metal bent to provide an arcuate portion adapted to engage the tire of a vehicle wheel, said arcuate portion being formed on a radius substantially greater than that of the tire to be engaged thereby and corresponding more nearly to a distorted condition of such tire under heavy impact rather than normal load.

2. A loading block having an arcuate tire engaging portion formed on a radius substantially greater than that of the tire to be engaged thereby.

3. A loading block having an arcuate tire engaging portion shaped to correspond more nearly to the curvature of the tire under distortion of excessive load rather than its curvature under normal load.

4. A loading block having an arcuate tire engaging portion of decreasing span and depth from front to rear.

5. A loading block constructed of a single strip of metal bent to form a pair of leg portions and an intervening arcuate tire engaging portion of decreasing span from front to rear, said leg portions extending perpendicularly with respect to the edges of the tire engaging portions and relatively angularly arranged.

6. A loading block having a curved tire engaging portion and a bracing strap pivoted thereto in proximity to its forward edge and substantially midway between its outer ends and extending forwardly thereof to a point of attachment.

7. A loading block having a curved metal plate adapted to engage the periphery of a tire and a bracing strap pivoted underneath and extending forwardly thereof.

8. A loading block formed of a single piece of sheet metal bent to provide a curved tire engaging portion and a pair of supporting leg portions carrying the tire engaging portion, said legs being reinforced by longitudinal corrugations which extend across the curved tire engaging portion at the rear only.

9. A loading block formed of a single strip of sheet metal bent to provide a curved tire engaging portion and a pair of leg portions, a bracing member bridging the space between the leg portions at their upper ends at the rear and provided with marginal flanges corrugated to interfit within the corrugations in the leg portions and secured thereto.

10. A loading block having a pair of legs held in braced apart relationship by a metal brace member extending therebetween and reinforced with corrugations extending diagonally from its lower outer corners and converging near its upper margin intermediate the legs and a transverse corrugation bridging said diagonal corrugations.

In testimony whereof I, CARL B. PARSONS, sign this specification.

CARL B. PARSONS.